United States Patent Office 3,030,342
Patented Apr. 17, 1962

3,030,342
SALTS OF STYRENE-MALEIC ANHYDRIDE COPOLYMERS
Harlan E. Tiefenthal, Pitcairn, and Yoon Chai Lee, Pittsburgh, Pa., assignors to Koppers Company, Inc., a corporation of Delaware
No Drawing. Filed Jan. 15, 1960, Ser. No. 2,574
8 Claims. (Cl. 260—78.5)

This invention relates to the preparation of salts of styrene-maleic anhydride copolymers. In one specific aspect, it relates to a new and direct method of making solid, water-soluble, substantially ester-free styrene-maleic anhydride copolymer alkali metal salts.

For many years, water solutions of the salts of styrene-maleic anhydride copolymer have been used as thickeners for paints, latices and ink, ingredients in adhesive formulations, components of rug backing materials and warp-sizing agents. Early in the development of the art it was recognized that the efficiency of the styrene-maleic anhydried copolymer salts in the various applications depends on certain physical characteristics exhibited by the salt in aqueous solution; i.e. the uniformity of the viscosity of the aqueous salt solution, the stability of the aqueous salt solution, and the thickening power thereof. It was soon discovered that the behavior of the salts in aqueous solution was determined to a large extent by the method used to prepare the salt. Numerous preparative methods were investigated and attempts were made to modify or improve the physical characteristics of the product by treating the copolymer during or after its formation with various chemical modifying agents.

By far the most successful of these modifications, from the standpoint of preparing a thickener, is described in the copending application of Eugene C. Suhrie, S.N. 492,037, filed March 3, 1955, now U.S. Patent 2,921,930. Suhrie discloses and claims a modified styrene-maleic anhydride copolymer, comprising the reaction product of the copolymer and a water-soluble polyoxyethylene ether of a monohydric fatty aliphatic alcohol, obtained by contacting the copolymer and the hydroxy ether at a temperature of at least 70° C. and below the decomposition temperature of the reaction product. The copolymer can be thus modified by the ether during or after the copolymerization step. The modified copolymer is recovered from the reaction mixture in which it is prepared, preferably by the evaporation of the reaction medium. The modified copolymer is then reacted with a predetermined quantity of an alkali metal hydroxide in aqueous solution. The thickening power of the aqueous salt solution thus prepared is astonishing. By comparative tests, the Suhrie thickener has been shown to possess a thickening power 10–30 times greater than other modified styrene-maleic anhydride copolymer salts in commercial use.

The Suhrie process thus provides an efficient way for making aqueous solutions of styrene-maleic anhydride copolymer alkali metal salts. Unfortunately, the aqueous salt solutions are not indefinitely stable. On long standing, they tend to decrease in viscosity, and thus adversely affect the latices or other formulation in which they are used. Recently, because of this lack of storage stability and the high shipping costs involved in transporting the aqueous salt solutions, there has been a considerable demand for an effective method of making solid salts of styrene-maleic anhydride copolymer.

Solid salts can be made from the aqueous salt solutions of Suhrie by known means; i.e. vacuum stripping. Unfortunately, in commercial practice this method is cumbersome and expensive, because of the large amounts of water which must be removed and because of the considerable foaming and frothing that occurs during evaporation of the salt solutions under vacuum.

One attempt to provide a suitable method for obtaining a solid salt of styrene-maleic anhydride copolymer is described in German Patent 1,016,936. According to the German process, the polymerization of styrene and maleic anhydride is effected in an inert solvent in the presence of 5–20% by weight of a ketone, such as methylethyl ketone. After polymerization is complete, the required amount of alkali metal hydroxide is dissolved in normal butyl alcohol and added to the reaction slurry. The slurry is allowed to stir at 30° C. for 4–5 hours and the alkali metal salt of styrene-maleic anhydride copolymer forms. There is no convenient way to observe completion of the reaction. Although the German process provides a method of obtaining the copolymer salt in solid form which is considerably more practical than the vacuum stripping technique, the salt produced by the German process has certain undesirable properties which make it unsuitable for use as a thickener for paints and as an additive for rug backing latices. The normal butyl alcohol undergoes esterification with the styrene-maleic anhydried copolymer in the presence of the base; the resulting product thus contains a considerable number of ester linkages. When the esterified salt is used as a thickener for a paint latex, it undergoes hydrolysis (saponification) at the basic pH of the latex system. The hydrolysis causes a measurable variation in the pH of the system which, in turn, affects the viscosity of the latex. Paints made using such thickeners have poor shelf life and hence are commercially unsatisfactory. In rug backing applications, the variations in latex viscosity caused by the hydrolysis of the ester linkages results in a non-uniform coating on the rug. In addition, the solid salt made by the German process, when placed in aqueous solution, has a relatively low thickening power in comparison with that of the aqueous salt solutions obtainable using the Suhrie process.

Quite surprisingly, we have discovered a novel and direct method of making solid alkali metal salts of styrene-maleic anhydride copolymer which, in contrast with those obtainable by the German process, are substantially free of ester linkages and which, in addition, can be made with good thickening characteristics.

It is, therefore, an object of the present invention to provide a new method of making substantially ester-free, solid alkali metal salts of styrene-maleic anhydride copolymer which is markedly superior to known processes from an economic standpoint and from the standpoint of product quality.

In accordance with the invention, a slurry of styrene-maleic anhydride copolymer in an inert organic medium is admixed with an alkali metal hydroxide in the presence of a secondary lower alkanol in an amount sufficient to promote ionization of the alkali metal hydroxide. The mixture is allowed to react, whereby a solid, water-soluble, substantially ester-free styrene-maleic anhydride copolymer alkali metal salt is formed. This solid salt is recovered from the reaction mixture by conventional means.

The slurry of styrene-maleic anhydride copolymer in the inert organic medium is conveniently (since it eliminates the step of isolating the copolymer) the reaction mixture obtainable from the conventional copolymerization of styrene and maleic anhydride, after copolymerization is complete. A conventional process for making the copolymer involves copolymerizing a susbtantially equimolar quantity of maleic anhydride with styrene in an inert organic medium, e.g. toluene, in the presence of a peroxide initiator such as benzyl peroxoide, lauroyl peroxide, dicumyl peroxide, and the like. The reaction mixture is heated at a temperature ranging from about 70–180° C. until copolymerization is complete, which generally occurs in about 5–10 hours.

The mole ratio of styrene to maleic anhydride in the copolymer should be at least equal to 1:1 and preferably in the range of 1:1–5:4, since the water solubility of the alkali metal salt of the copolymer decreases with decreasing acid content.

Copolymerization is conducted preferably, but not necessarily, in the presence of 1–25% by weight, based upon the weight of monomer, of a water-soluble polyoxyethylene condensate of ethylene oxide and a monohydric aliphatic alcohol having from 10–30 carbon atoms. Such condensates include polyoxyethylated decyl, lauryl, myristyl, palmityl, stearyl, oleyl and tridecyl alcohols. The polyoxyethylated products contain an average of about 15–25 polyoxyethylene groups per molecule, although, because of the roughly Gaussian distribution of oxyethylene groups obtained during condensation, some individual molecules may contain as few as 5 and as many as 30–35 polyoxyethylene groups. The polyoxyethylene condensate does not, as in the Suhrie process described hereabove, appear to enter into the reaction, possibly because of the addition of the secondary alkanol during the salt formation step. The presence of the condensate simply helps to provide a final reaction mass having a higher percentage of copolymer solids and to render the mass more easily stirrable.

The inert organic medium in which the polymerization is conducted must be a non-solvent for the styrene-maleic anhydride copolymer and for the subsequently formed copolymer alkali metal salts. Suitable non-solvent media include aromatic hydrocarbons such as benzene, toluene, alkylbenzenes, dialkylbenzenes and trialkylbenzenes; saturated aliphatic hydrocarbons such as hexane, heptane, octane and nonane; alicyclic hydrocarbons such as cyclopentane, cyclohexane and cycloheptane; and chlorinated hydrocarbons such as carbon tetrachloride, tetrachloroethane, trichloroethane and chlorobenzene. Ketones and certain other oxygenated solvents are not, as a class, suitable because of the solubility of styrene-maleic anhydride copolymer therein.

The final copolymerization slurry contains preferably 20–30% by weight copolymer solids, but it may contain as little as 5% by weight.

To convert styrene maleic anhydride copolymer to its alkali metal salts a slurry of the copolymer in an inert organic medium is formed, as described hereabove, and the appropriate quantity of alkali metal hydroxide is added thereto. The choice of alkali metal hydroxide obviously depends upon the salt desired. For this purpose sodium, potassium and lithium hydroxides work equally well, but sodium hydroxide is the preferred reagent because of the commercial importance of the sodium salt of styrene-maleic anhydride copolymer.

The alkali metal hydroxide must be used in amount sufficient to provide a water-soluble salt. The so-called ¾ (¾ of the stoichiometric requirement of sodium hydroxide) and full (the stoichiometric requirement) alkali metal salts are of particular commercial significance. No advantage is seen in using an amount of alkali metal hydroxide substantially in excess of the stoichiometric requirement, although such an amount can be used without ill effect.

In order to make the solid, substantially ester-free alkali metal salts according to the invention, the reaction between the alkali metal hydroxide and the copolymer must take place in the presence of a secondary lower alkanol. The use of a secondary alcohol is critical. Normal alcohols such as ethyl alcohol and normal butyl alcohol are unsuitable, since their use results in the esterification of the styrene-maleic anhydride copolymer which, in turn, causes instability of the viscosity of latices thickened therewith. Tertiary alcohols, such as tertiary-butyl alcohol, do not promote ionization or solubility of the alkali metal hydroxide at a reasonable rate and in the presence of these alcohols, relatively little or no salt formation occurs. Useful secondary lower alcohols include isopropyl alcohol, secondary butyl alcohol, secondary amyl alcohol, and the like.

Salt formation occurs conveniently at a temperature ranging between room temperature and the boiling point of the particular alcohol used to promote the reaction. Thus, any temperature between about 25–132° C. is suitable. The secondary lower alkanol is used in an amount sufficient to promote ionization or solubility of the alkali metal hydroxide at a practical rate. Generally speaking, this amount ranges between about 0.5 to 5 parts (by weight) alkanol for each part of styrene-maleic anhydride copolymer. The preferred alkanol/copolymer weight ratio is from 2:1–3:1.

The reaction works well at atmospheric pressure, although higher or lower pressures could be used, if desired.

Salt formation starts almost instantaneously, but it is preferable to allow the reaction mixture to stir for a reasonable period of time, e.g. 8–24 hours at room temperature, to insure completeness of the reaction. The exact reaction time used will depend upon thoroughness of contact, efficiency of mixing, temperature, and other processing conditions apparent to those skilled in the art. The extent of reaction can be conveniently estimated by observing the disappearance of the solid alkali metal hydroxide.

When reaction between the styrene-maleic anhydride copolymer and the alkali metal hydroxide occurs, the solid, alkali metal salt of the copolymer is insoluble in the reaction mixture. The solid salt is conveniently recovered by conventional separation techniques such as filtration or centrifugation. After the solid alkali metal salt is separated from the reaction mixture it may be washed, if desired, using an inert organic non-solvent of the type used to slurry the styrene-maleic anhydride copolymer. As a matter of convenience, it is preferable to wash the salt with the same inert organic medium which formed a part of the reaction mixture.

After the washing step (or after separation if the washing step is omitted) the product is dried by conventional means. Vacuum drying at a temperature of e.g. 100–150° C. is quite effective.

The solid salts of the invention, prepared as described hereabove, form stable, aqueous solutions of uniform viscosity, even at a salt content of as high as 30% by weight. The stability and uniformity of the solutions makes them commercially suitable for use in warp sizing and as additives to rug backing formulations. The viscosity and thickening power of these aqueous solutions are comparable to those of most commercially available materials, but the solutions lack the high viscosity and remarkable thickening power of the salt solutions obtainable from the Suhrie process. As we have previously noted in connection with our direct solid salt preparation, the presence, during the polymerization step, of a water-soluble, polyoxyethylene condensate of ethylene oxide and a monohydric aliphatic alcohol, does not function as in the Suhrie process to give, as an ultimate product, an aqueous salt solution of high thickening power. In accordance with one embodiment of the invention, we have discovered that a solid salt capable of providing an aqueous solution of improved thickening power, can be obtained by reslurrying our dry solid salts in an inert organic medium of the class described hereabove in connection with the copolymerization of styrene and maleic anhydride. The concentration of solid salt in such a slurry is a matter of convenience, but is preferably between about 5 and 30%. To the slurry is added a water-soluble, polyoxyethylene condensate of ethylene oxide and a monohydric aliphatic alcohol of the class hereinbefore described in connection with the copolymerization step. The amount of condensate added ranges between about 1 and 10% by weight based upon the amount of copolymer salt in the slurry. The slurry is heated to a temperature ranging between 70° C. and the boiling point of the inert organic medium for at least about two hours and preferably from 4–24 hours. The heating time obviously varies with the temperature used. As shown in the examples that follow, at lower temperatures, e.g. 90° C., a two and a half hour heating period is required in order to obtain a measurable increase in thickening power. The increase in thickening power is generally promoted by heating the slurry at higher temperatures. Longer heating times tend to enhance the thickening power to a much greater extent.

After the heating step the solid copolymer salt is recovered from the slurry by filtration or evaporation. If lower temperatures, e.g. 70–90° C., are used during the heating step, the product obtained by evaporation of the liquid organic medium generally has significantly higher thickening power than that obtained by removing the inert organic medium by filtration. The solid salt thus obtained has a thickening power of from 2–10 times greater than that made without the post-treatment with the ethylene oxide-alcohol condensate.

Our invention is further illustrated by the following examples. The term "parts" as used in the examples refers to parts by weight.

EXAMPLE I

A copolymer was prepared by dissolving 196 parts of maleic anhydride and 20 parts of "Emulphor ON," a water-soluble condensate of oleyl alcohol and ethylene oxide which contains an average of about 20 polyoxyethylene groups per molecule, in 1208 parts of toluene. A solution comprising one part benzoyl peroxide and 208 parts styrene was added dropwise thereto at a temperature of 80° C. After the addition was complete, the reaction temperature was raised to 90° C. and held for nine hours. The mixture was thereafter cooled to room temperature.

The solid ¾ sodium salt was prepared by adding to the copolymer slurry 120 parts of sodium hydroxide pellets (99.4% NaOH) and 986 parts of isopropyl alcohol. The mixture was heated at 45° C. for one hour with stirring, cooled to room temperature and stirred overnight. The solid sodium salt was separated by filtration, washed with toluene and dried under vacuum for about 12 hours at 150° C. There was thus obtained 506 parts by weight of the solid ¾ sodium salt of styrene-maleic anhydride copolymer, representing a substantially quantitative yield. Infrared analysis showed the product to be substantially free of ester linkages.

A 10% aqueous solution of the product sodium salt was prepared by dissolving 10 g. of the solid salt in 90 g. of water. The resulting solution was clear and the viscosity thereof, as determined by a Brookfield LVF Model Viscometer, was substantially unchanged over a period of several days.

The solid "full" sodium salt is obtained as described hereabove by using 160 parts rather than 120 parts of sodium hydroxide pellets.

EXAMPLE II

The procedure of Example I was repeated with the exception that the secondary butyl alcohol, 986 parts, was used in place of the isopropyl alcohol. There was obtained 502 parts of the solid ¾ sodium salt of styrene-maleic anhydride copolymer, substantially identical in its physical properties with the product of Example I.

EXAMPLE III

The procedure of Examples I and II was repeated with the exception that n-butyl alcohol was used in place of the secondary alcohols. There was obtained 500 parts of a solid ¾ sodium salt of styrene-maleic anhydride copolymer. A representative sample of this salt was shown by infrared analysis to contain ester linkages.

A 10% aqueous solution was made by dissolving 10 parts of the product solid salt in 90 parts of water. The resulting solution was somewhat hazy and the viscosity thereof, as determined by the Brookfield viscometer, fluctuated on standing for several days.

EXAMPLE IV

The procedure of Example I was repeated with the exception that tertiary-butyl alcohol was used in place of the isopropyl alcohol during the salt formation step. The copolymer slurry containing sodium hydroxide and alcohol was heated at 45° C. for one hour, stirred at room temperature for 41 hours, subsequently stirred at 83° C. for 2.5 hours and thereafter stirred at room temperature for 21 additional hours. No appreciable amount of the solid ¾ sodium salt of styrene maleic anhydride copolymer was formed.

EXAMPLE V

Twenty-five parts of a solid ¾ sodium salt prepared according to the procedure of Example II was suspended in a solution containing 25 parts of toluene and 1.25 parts of "Emulphor ON." The reaction mixture was immediately evaporated to dryness in vacuo at 150°. There was thus obtained the solid ¾ salt of styrene-maleic anhydride copolymer.

EXAMPLE VI

Twenty-five parts of a solid ¾ sodium salt prepared according to the procedure of Example II was suspended in a solution containing 25 parts of toluene and 1.25 parts of "Emulphor ON" and stirred at 90° C. for 2½ hours. The reaction mixture was evaporated to dryness in vacuo at 150° C. to obtain the solid ¾ sodium salt of styrene-maleic anhydride copolymer.

EXAMPLE VII

The thickening power of various solid ¾ sodium salts made according to the method of the invention was measured. Ten percent aqueous solutions of the products of Examples II, V and VI were prepared and the thickening effect of the solutions on a GRS–2,000 Latex (a Government standard styrene-butadiene rubbery copolymer in aqueous suspension) was determined by viscosity measurements using the Brookfield viscometer. The solutions were added to the latex at the 2% concentration lever (liquid/liquid basis). The results are shown hereunder in Table I.

TABLE I

*Aqueous Solution Thickening Effects (Temperature, 30°±10° C.)*

| Salt Preparation | Brookfield Viscosity of Thickened GRS-2000 Latex, cps. | |
|---|---|---|
| | 60 r.p.m. | 6 r.p.m. |
| Control (no salt added to latex) | 30 | 30 |
| Example I | 60 | 80 |
| Example V | 72 | 65 |
| Example VI | 138 | 160 |

It is apparent from the data in Table I that the post-heating with the ethylene oxide-alcohol condensate for 2.5 hours (the product of Example VI) resulted in a measurable improvement in solution viscosity and thickening power. The viscosity and thickening power of the solid sodium salts is improved to a greater extent if the post-heating period is extended to 4–12 hours.

We have thus provided a new direct method for making substantially ester-free solid alkali metal salts of styrene-maleic anhydride copolymer. The stable aqueous solutions of our novel salts have a uniform viscosity and may be prepared in concentrations as high as 30% by weight. In one aspect of the invention we have provided a solid salt of good thickening power which could be commercially competitive with the most effective of the heretofore known materials. By our novel and direct method we have eliminated the need of the intermediate isolation of the copolymer and we have obviated the difficulties attendant salt recovery by vacuum evaporation from an aqueous medium.

We claim:

1. Method of making a solid, water-soluble, substantially ester-free alkali metal salt of a styrene-maleic anhydride copolymer comprising admixing a slurry of styrene-maleic anhydride copolymer in an inert organic medium containing up to 30% by weight copolymer solids, said copolymer having a styrene to maleic anhydride mole ratio of 1:1–5:4, with a substantially anhydrous alkali metal hydroxide in the presence of from about 0.5–5 parts by weight of a secondary lower alkanol having up to five carbon atoms based upon the weight of said copolymer, allowing the mixture to react at a temperature of 25 to 132° C., whereby said solid alkali metal salt is formed, and separating said solid salt therefrom.

2. Method according to claim 1 wherein said alkanol is isopropanol.

3. Method according to claim 1 wherein said alkanol is secondary butyl alcohol.

4. Method of making a solid, water-soluble, substantially ester-free alkali metal salt of a styrene-maleic anhydride copolymer comprising admixing a slurry of styrene-maleic anhydride copolymer in an inert organic medium, said copolymer having a styrene to maleic anhydride mole ratio of 1:1–5:4, with a solid alkali metal hydroxide in the presence of a secondary lower alkanol having up to five carbon atoms in an amount sufficient to promote ionization of said alkali metal hydroxide, allowing the mixture to react at a temperature between about 25° C. and the boiling point of said alkanol, whereby said solid alkali metal salt is formed, and separating said solid salt therefrom.

5. Method according to claim 4 wherein said alkali metal hydroxide is used in an amount of about ¾ to the full stoichiometric requirement.

6. Method according to claim 4 wherein said medium is toluene.

7. Method of making a solid, water-soluble, substantially ester-free alkali metal salt of a styrene-maleic anhydride copolymer suitable for use in latices and having improved thickening power comprising admixing a slurry of styrene-maleic anhydride copolymer in an inert organic medium, said copolymer having a styrene to maleic anhydride mole ratio of 1:1–5:4, with a substantially anhydrous alkali metal hydroxide in the presence of a secondary lower alkanol having up to five carbon atoms in an amount sufficient to promote ionization of said alkali metal hydroxide, allowing the mixture to react at a temperature of 25 to 132° C., whereby said solid alkali metal salt is formed, separating said solid salt therefrom, reslurrying said solid salt in a fresh portion of said organic medium, heating the slurry of said salt at a temperature of 70° C. to the boiling point of said medium for at least two hours in the presence of a water-soluble condensate of ethylene oxide and a monohydric aliphatic alcohol having from 10–30 carbon atoms, said condensate having an average of 15–25 polyoxyethylene groups per molecule, and separating the solid alkali metal copolymer salt from the slurry.

8. Method of making a solid, water-soluble, substantially ester-free alkali metal salt of a styrene-maleic anhydride copolymer suitable for use in latices and having improved thickening power comprising admixing a slurry of styrene-maleic anhydride copolymer in toluene containing up to 30% by weight copolymer solids, said copolymer having a styrene to maleic anhydride mole ratio of 1:1–5:4, with solid anhydrous sodium hydroxide in the presence of 0.5–5 parts by weight of a secondary lower alkanol based on the weight of copolymer, allowing the mixture to react at a temperature of 25–132° C., whereby said solid alkali metal salt is formed, separating said solid salt therefrom, reslurrying said solid salt in a fresh portion of toluene, heating the slurry of solid salt at a temperature of 70–110° C. for 2–24 hours in the presence of 1–10% by weight of a water-soluble condensate of ethylene oxide and a monohydric aliphatic alcohol having from 10–30 carbon atoms, said condensate having an average of 15–25 polyoxyethylene groups per molecule, and separating the solid alkali metal copolymer salt from the slurry.

References Cited in the file of this patent

UNITED STATES PATENTS

| | | |
|---|---|---|
| 2,616,849 | Giammaria | Nov. 4, 1952 |
| 2,892,736 | Johnson et al. | June 30, 1959 |
| 2,921,930 | Subrie | Jan. 19, 1960 |

FOREIGN PATENTS

| | | |
|---|---|---|
| 1,016,936 | Germany | Oct. 3, 1957 |

OTHER REFERENCES

Moran et al.: Journ. Amer. Chem. Soc., vol. 69, pages 1457–1459 (1947).

Garrette et al.: Journal Amer.-Chem. Soc., vol. 73, 4533–4535 (1951).

Bamford et al.: Discussions of the Faraday Society, vol. 14, pages 208–216 (1953).

UNITED STATES PATENT OFFICE
CERTIFICATE OF CORRECTION

Patent No. 3,030,342

April 17, 1962

Harlan E. Tiefenthal et al.

It is hereby certified that error appears in the above numbered patent requiring correction and that the said Letters Patent should read as corrected below.

Column 8, line 4, for "said salt" read -- solid salt --.

Signed and sealed this 4th day of December 1962.

(SEAL)
Attest:

ERNEST W. SWIDER
Attesting Officer

DAVID L. LADD
Commissioner of Patents